United States Patent [19]

Hayworth

[11] 3,862,916

[45] Jan. 28, 1975

[54] SOLUTIONS OF POLYVINYL ACETALS WITH PHENOLIC ANTIOXIDANT IN PREPARATION FOR RESTORING AND/OR PRESERVING PAPERS

[75] Inventor: Curtis B. Hayworth, Morristown, N.J.

[73] Assignee: World Patent Development Corp., New York, N.Y.

[22] Filed: Feb. 5, 1973

[21] Appl. No.: 329,306

[52] U.S. Cl.......... 260/29.6 ME, 117/2 R, 252/404, 260/29.6 E, 260/29.6 MH, 260/29.6 BE, 260/32.8 R, 260/33.4 R, 260/33.6 NA, 260/45.95
[51] Int. Cl...................... C08f 29/26, C08f 45/24
[58] Field of Search.. 260/29.6 MH, 29.6 ME, 73 L, 260/29.6; 117/2 R

[56] References Cited
UNITED STATES PATENTS

| | | | |
|---|---|---|---|
| 2,487,223 | 11/1949 | Cupery | 260/29.6 ME X |
| 3,234,161 | 2/1966 | Snelgrove et al. | 260/73 L X |
| 3,576,320 | 11/1951 | Vlad et al. | 117/2 R |
| 3,620,803 | 11/1971 | Lineberger | 260/29.6 ME X |
| 3,859,207 | 11/1958 | Dahle | 260/73 L |

*Primary Examiner*—Lucille M. Phynes
*Attorney, Agent, or Firm*—Charles E. Baxley, Esq.

[57] ABSTRACT

A stable monophasic composition is here taught consisting of a solution of an antioxidant and copolymers of polyvinyl acetals in a solvent mixture containing a chlorinated hydrocarbon and an aqueous solution of a basic agent. The composition is useful for restoring and preserving papers and similar materials without discoloration.

4 Claims, No Drawings

SOLUTIONS OF POLYVINYL ACETALS WITH PHENOLIC ANTIOXIDANT IN PREPARATION FOR RESTORING AND/OR PRESERVING PAPERS

This invention relates generally to new and useful improvements in prolonged preservation of degradable sheet materials, such as, for example, papers and the like, and particularly seeks to provide novel means and methods for preventing and halting discoloration of papers which have been or are being treated, to prevent deterioration of and to preserve papers.

In my copending patent application, Ser. No. 221,102, filed Jan. 26, 1972, now U.S. Pat. No. 3,778,401 granted Dec. 11, 1973, there are described monophasic compositions for restoring and preserving papers. These compositions consist of a solution of a copolymer of polyvinyl acetals in a solvent mixture consisting of a chlorinated hydrocarbon and isopropanol, methyl isobutyl ketone or mixtures of isopropanol and methyl isobutyl ketone, to which solution there has been added a solution in a water miscible alcohol of a basic agent dissolved in water or of a hydrated basic agent. Suitable copolymers consist in percentage by weight of about 15–25 percent of polyvinyl alcohol, 1–3 percent polyvinyl acetate and 70–82 percent of one or more polyvinyl acetals selected from acetals of formaldehyde, acetaldehyde and butyraldehyde. Preferably, the chlorinated hydrocarbon solvent contains 2 carbon atoms. Examples of such solvents are ethylene chloride, ethylidene dichloride, 1,1,1-trichlorethane, 1,1,2-trichloroethylene, 1,1,2,2-tetrachloroethylene and 1,1,1,2-tetrachloroethylene. 1,1,2-trichloroethylene is preferred. The basic agent is preferably inorganic and may be a hydroxide of sodium or potassium, strontium, barium or lithium, a carbonate of sodium or potassium, a bicarbonate of sodium, potassium or lithium; an acetate of sodium, potassium, lithium, barium or magnesium; or hydrates of said compounds. suitable water-miscible alcohols include methanol, ethanol, propanol, isopropanol and mixtures thereof. Instead of first dissolving the basic agent in water, a hydrate of the basic agent may be added to the water-miscible alcohol.

When subjecting materials to preservation treatment, the materials, such as for example, newspapers and books, are dipped into the preservative compositions which impregnate the paper or else the compositions are applied by brushing, spraying or otherwise to the materials. Such treatment preserves the paper against aging as determined by tests developed at the U.S. Bureau of Standards where it was shown that exposure of papers at 100°C. for three (3) days is equivalent to natural aging for twenty-five (25) years (See Hobbs, R. B., "Estimating the Life Expectancy of Book Papers; Permanent Durable Book Paper, "Summary of a Conference held in Washington, D.C. Sep. 16, 1960, page 49, Virginia State Library 1960).

However, it has now been observed that when papers, after impregnation with preservative solutions described in may copending patent application referred to above, were aged artificially at 100°C. they changed color, turning first yellow, then brown, depending on total exposure time. Because it is a principal purpose of impregnation of papers with such preservative compositions to preserve them for the future, discoloration of these papers make the treatment with such preservative compositions undesirable even though such treatment physically strengthens the papers.

It is, accordingly, an object of the present invention to provide preservative compositions for paper which do not cause discoloration of paper treated with such compositions.

It is another object of the present invention to provide preservative compositions for paper which do not cause discoloration of the paper treated with such compositions and which compositions also strengthen the paper.

In accordance with the present invention it has been found that the addition of an antioxidant to preservative compositions for paper, of the type described above will prevent the discoloration on aging of paper treated with such compositions without affecting the other valuable properties imparted to the paper on treatment with these compositions.

While most antioxidants have been found useful in such improved compositions, I have found it desirable to use phenolic type antioxidants such as for example, tert-butylphenols and derivatives thereof. Of particular value are derivatives of tert-butyl phenols marketed by Ethyl Corporation under the "Ethyl" Antioxidant name. In particular, "Ethyl" Antioxidant 330, 1,3,5-trimethyl-2,4,6-tri (3,5-di-tert-butyl-4-hydroxybenzyl)-benzene, has given superior results in preventing or reducing discoloration of treated paper during accelerated aging studies. The antioxidant is present in an amount of about 0.1 to 1.0 percent by weight based on the amount of the copolymer of polyvinyl acetals present in the preservative compositions.

In preparing the compositions of the present invention, the desired amounts of the copolymer of polyvinyl acetal and the antioxidant are dissolved in the solvent mixture of the chlorinated hydrocarbon and isopropanol, methyl isobutyl ketone or mixtures of isopropanol and methyl isobutyl ketone. To this solution is added a solution of the basic agent in a water-miscible alcohol. As an illustration, 3–6 g. of the copolymer and 0.3–0.06 g. of "Ethyl" Antioxidant 330 are dissolved in 100 cc. of a solution containing from 60–95 cc. of trichloroethylene and from 5–40 cc. of the isopropanol or methyl isobutyl ketone or mixture thereof. If desired, 1 cc. of water may be added in place of either 1 cc. of the isopropanol or the ketone. Other water-miscible solvent such as methanol, ethanol, propanol, acetone or methyl ethyl ketone may be used in place of the isopropanol or the methyl isobutyl ketone. To 100 cc. of the solution of the copolymer, 2 cc. of an alcoholic solution of the basic agent dissolved in water is added. From about 0.5 to 20 g. of the basic agent can be present in about 100 cc. of the alcoholic solution.

The invention will be understood more fully from the examples and comparative examples which follow. These examples are given by way of illustration and are not to be considered as limiting.

EXAMPLE 1

The following solutions were prepared:

Solution 1 - Three grams of the copolymer of polyvinylacetal were dissolved in a mixture of 40 cc. of methylisobutylketone and 60 cc. of trichloroethylene.

Solution 2 –3.5 grams of the copolymer of polyvinylacetal were dissolved in a mixture of 79.5 cc. trichloroethylene, 15 cc. isopropylalcohol, 5 cc. methylisobutylketone, and 0.5 cc. water. To this were added 0.035 grams of "Ethyl" Antioxidant 330, and 2 cc. of 10 percent solution of Ba(OH)$_2$.8H$_2$O in methyl alcohol.

Solution 3 - Three grams of the copolymer of polyvinylacetal and 0.03 grams of "Ethyl" Antioxidant 330 were dissolved in 73 cc. of trichloroethylene, 13 cc. isopropyl alcohol, 13 cc. magnesium-sodium solution (see below), and 1 cc. methanol. The magnesium-sodium solution was prepared as follows: 60 grams of magnesium acetate dissolved in a mixture of 291 cc. ethyl alcohol and 9 cc. water. To this were added 300 cc. isopropyl alcohol and 240 cc. methyl alcohol. Four grams sodium hydroxide were dissolved in a mixture of 47 cc. methyl alcohol and 3 cc. water To this was added 50 cc. of isopropyl alcohol. 60 cc. of this sodium hydroxide solution was then added to 840 cc. of magnesium acetate solution.

Papers, as described below, were impregnated with these solutions and then dried and exposed to 100°C for various time periods, after which the brightness of the papers was measured. Brightness was determined with a photovolt reflectometer instrument, with the higher reading indicating a whiter sample. The table below shows the superior performance of compositions containing the antioxidant. This table is based on points taken from smoothed curves that represent the actual laboratory data.

| | Brightness Readings %  After Aging | | |
|---|---|---|---|
| Solution No. | 1 | 2 | 3 |
| Paper | A | A | B |
| Days Aged — 0 | 52 | 64 | 82 |
| 5 | 29 | 63 | 81 |
| 10 | 18 | 62 | 80 |
| 15 | 12 | 61 | 79 |
| 20 | 10 | 60 | 78 |
| 25 | 9 | 59 | 77 |

A) Pages from 108 year old book.
B) Whatman Paper No. 1

As can be seen, the paper coated with the solution that did not contain the antioxidant, Solution 1, turned color, i.e., a reading of 9 after 25 days of aging as compared to 59, almost white, for Solution 2 or 77 for Solution 3, both containing the antioxidant.

EXAMPLE 2

Sections of Whatman Paper No. 1, the paper identified as paper B-in Example 1, were dipped for 5 minutes in solutions of copolymers of polyvinylacetal, copolymer of polyvinylacetal with magnesium acetate, and copolymer of polyvinylacetal with magnesium acetate and "Ethyl" Antioxidant 330. These papers were then dried and exposed to artificial aging at 100°C for a various number of days. Subsequent to this the papers were removed and conditioned at 23°C, 50 percent humidity for at least 24 hours before brightness reading and fold endurances were measured. Brightness readings were performed as described in Example 1. Folding endurance was performed on an M.I.T. folding endurance tester at 0.5 kilogram tension. A 15 millimeter wide strip was folded back and forth through 135 degrees until the strip broke.

Sample 1,300 — This is untreated Whatman Paper and was run as a control test to show the effect of aging on Whatman paper per se.

Sample 1,301 — Samples of Whatman Paper No. 1 were dipped for 5 minutes in the following solution: 24 grams of copolymer of polyvinylacetal were dissolved in a mixture of 720 cc. of trichloroethylene and 80 cc. of isopropyl alcohol.

Sample 1302 — Pieces of Whatman Paper No. 1 were dipped in a solution that was prepared as follows: To the solution of Sample 1,301 was added a solution consisting of 8 grams of magnesium acetate. 4H$_2$O dissolved in 8 cc. of water to which was added 8 cc. of isopropyl alcohol. This solution was then added to the solution of sample of 1301.

Sample 1303 — Pieces of Whatman Paper No. 1 were dipped for 5 minutes in the following solution:

To solution 1302 were added 0.24 grams of "Ethyl" Antioxidant 330. Thus, in all experiments the same basic solution was used, to which was first added magnesium acetate in sampel 1302 and finally, "Ethyl" Antioxidant 330 to solution 1303.

| | Brightness Reading %  After Aging | | | |
|---|---|---|---|---|
| Sample: | 1300 | 1301 | 1302 | 1303 |
| Paper: | B | B | B | B |
| Days Aged: 0 | 84 | 84 | 84 | 84 |
| 5 | 83 | 82 | 81 | 80 |
| 9 | 82 | 77 | 78 | 77 |
| 15 | 80 | 75 | 74 | 76 |
| 20 | 78 | 65 | 71 | 74 |
| 26 | 77 | 52 | 63 | 74 |

| Color Appearance: (Visual) | | | | |
|---|---|---|---|---|
| 26 | White | Browning | Yellowing | White |

| | Folding Endurance  After Aging | | | |
|---|---|---|---|---|
| Sample: | 1300 | 1301 | 1302 | 1303 |
| Paper: | B | B | B | B |
| Days Aged: 5 | 19 | 154 | 152 | 189 |
| 9 | 15 | 40 | 69 | 167 |
| 15 | 10 | 33 | 36 | 122 |
| 20 | 8 | 20 | 26 | 80 |
| 26 | 8 | 12 | 19 | 55 |

The sets of data for both brightness and fold endurance indicate that the presence of an antioxidant not only increases stability of the treated papers with respect to color, but also increases the strength of the treated paper.

1. A composition for restoring and preserving papers consisting of a solution of a phenolic antioxidant and a polyvinyl acetal, the amount of the antioxidant being from about 0.1 to 1 percent by weight based on the weight of said acetal in a solvent mixture consisting of a chlorinated hydrocarbon containing 2 carbon atoms and a solvent selected from a group consisting of isopropanol, methyl isobutyl ketone and mixtures of isopropanol and methyl isobutyl ketone, to which solution has been added a solution in a water-miscible alcohol of a basic agent dissolved in water or of a hydrated basic agent, said polyvinyl acetal consisting in percent by weight of about 15–25 percent vinyl alcohol, 1–3 percent vinyl acetate and 70–82 percent of vinyl alcohol units acetalized with one or more aldehydes selected from the group consisting of formaldehyde, acetaldehyde and butyraldehyde.

2. A composition according to claim 1, wherein the antioxidant is 1,3,5-trimethyl1-2,4,6-tri-(3,5-di-tert-butyl-4-hydroxybenzyl) benzene.

3. A composition according to claim 2, wherein the chlorinated hydrocarbon is 1,1,2-trichloroethylene.

4. A composition according to claim 3, wherein the basic agent is selected from a group consisting of barium hydroxide, sodium hydroxide and magnesium acetate.

* * * * *

UNITED STATES PATENT OFFICE
CERTIFICATE OF CORRECTION

Patent No. 3,862,916　　　　　　　　　Dated January 28, 1975

Inventor(s) Curtis B. Hayworth

It is certified that error appears in the above-identified patent and that said Letters Patent are hereby corrected as shown below:

Column 1, line 36, [or] should be a comma , .

Column 1, line 61, [may] should have been my.

Column 2, line 40, [0.3-0.06] should have been 0.03-0.06.

Signed and sealed this 1st day of April 1975.

(SEAL)
Attest:

RUTH C. MASON
Attesting Officer

C. MARSHALL DANN
Commissioner of Patents
and Trademarks